United States Patent [19]

LaRou

[11] Patent Number: 4,606,656
[45] Date of Patent: Aug. 19, 1986

[54] OUTER RACE LOCK PIN FOR BEARINGS

[75] Inventor: Albert M. LaRou, Naperville, Ill.

[73] Assignee: Emerson Electric Co., St. Louis, Mo.

[21] Appl. No.: 752,813

[22] Filed: Jul. 8, 1985

[51] Int. Cl.$^4$ .................. F16C 33/66; F16C 43/04
[52] U.S. Cl. .................. 384/475; 384/498; 384/585; 384/906
[58] Field of Search .............. 384/475, 906, 498, 541, 384/585; 277/136

[56] References Cited

U.S. PATENT DOCUMENTS 2,271,336  1/1942  Goldsmith .................. 384/541
2,441,294  5/1948  Shafer .................. 384/475
4,521,708  6/1985  Vandevier .................. 277/136

Primary Examiner—Lenard A. Footland
Attorney, Agent, or Firm—Aubrey L. Burgess

[57] ABSTRACT

A bearing in which a locking or locating pin is used to substantially prevent relative motion between its outer race and its housing, the locking pin preferably being formed by a cold heading technique from a slug of metal so as to have a generally cylindrical sleeve and a pin-like member in the sleeve which extends therefrom. When an axial compressive force is applied to the locking pin, the pin-like member telescopes into the sleeve, thereby preventing damage to the outer race of the bearing.

4 Claims, 4 Drawing Figures

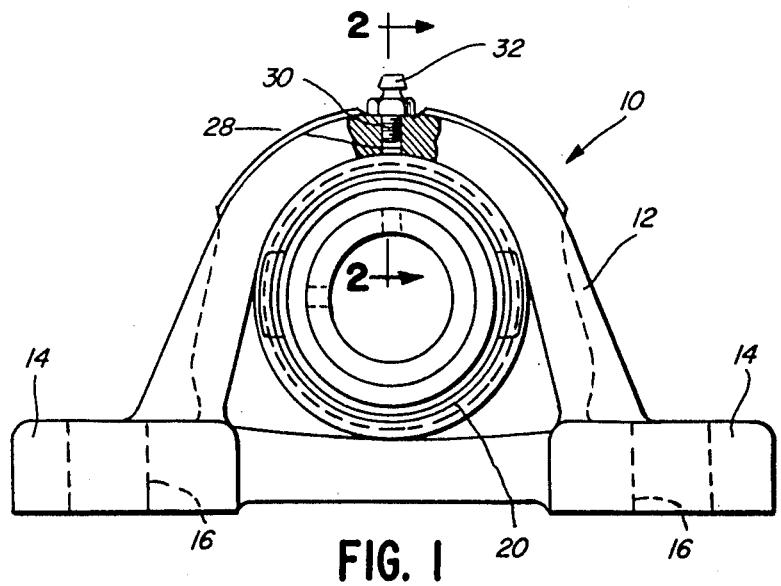
FIG. 1
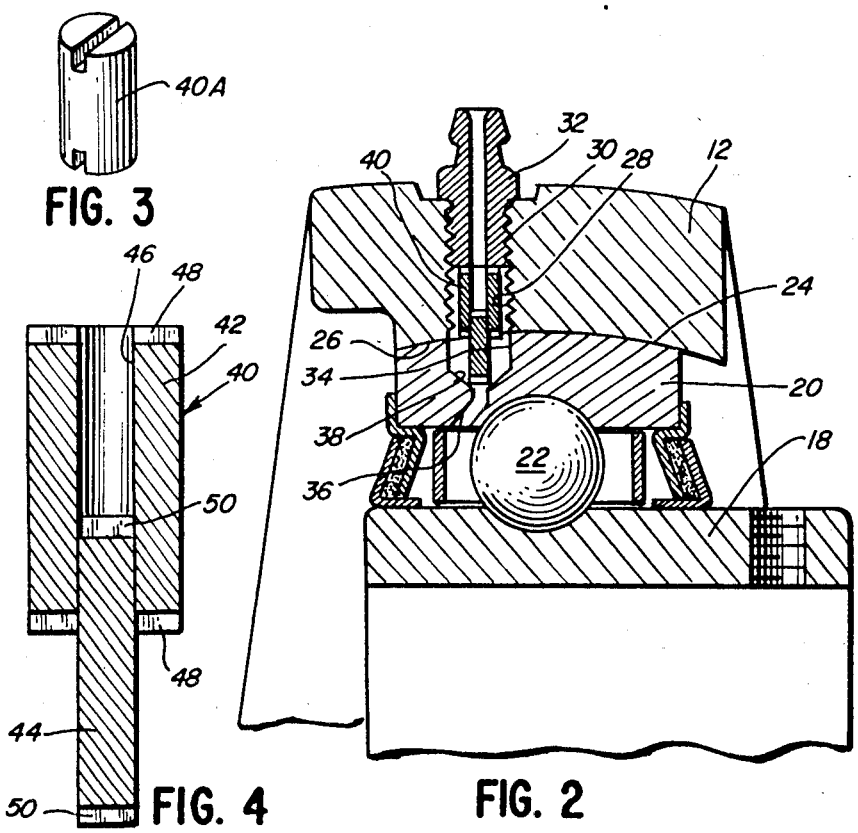
FIG. 3
FIG. 4
FIG. 2

OUTER RACE LOCK PIN FOR BEARINGS

BACKGROUND OF THE INVENTION

1. Field of the Invention

This invention relates to improved anti-friction bearings and especially those in which a locking or locating pin is used to prevent or control relative rotation and other relative movement between the outer race of the bearing and the bearing housing or pillow block. Locking pins as such are widely used in the manufacture of bearings, the pins being received in a lubrication passageway in the housing, and extending into a dimple in the outer race of the bearing. Usually locking pins are cylindrical metal members cut from rod stock. A grease fitting is threadably received in the lubrication passage abutting or slightly spaced from one end of the locking pin. When the grease fitting is installed, careful adjustment of the fitting is required in order to prevent distortion of the outer race due to an axial compressive force which may be applied to the locking pin when the fitting is tightened into position.

2. Description of the Prior Art

Shafer, U.S. Pat. No. 2,441,294, describes a bearing comprising a housing, inner and outer races, anti-friction elements between the races, a lubrication passage through the housing, a dimple in the outer race, a locking pin in the passage extending into the dimple, and a grease fitting threadably received in the passage.

SUMMARY OF THE INVENTION

According to this invention, an improved locking pin for a bearing is provided, the locking pin being capable of automatically adjusting in length when a grease fitting is set in the bearing housing. The pin is formed or constructed with a generally cylindrical or sleeve-like body and a central, lesser diameter pin-like member which telescopes into the sleeve-like body when subjected to an axial compressive force caused by setting or tightening down the grease fitting. The telescoping action eliminates the distortion of the outer race and the malfunction of the bearing.

The pin can be manufactured in two parts and then assembled; or preferably, it can be made from a slug of metal on a cold heading machine where the center slug is pushed far enough to reach tear-out but not pushed free, i.e., a shearing action rather than extrusion.

BRIEF DESCRIPTION OF THE DRAWING

FIG. 1 is a front elevational view of a typical bearing constructed according to this invention;

FIG. 2 is a cross-sectional view on an enlarged scale taken on line 2—2 of FIG. 1., illustrating the details of a bearing made according to this invention;

FIG. 3 is an illustration of a slug of metal before being formed on a cold heading machine; and FIG. 4 is a sectional view on an enlarged scale of a locking pin according to this invention.

DETAILED DESCRIPTION OF THE PREFERRED EMBODIMENT

Looking at the drawing, there is illustrated a bearing 10 comprising a housing 12 having feet 14, 14 through which openings 16, 16 are provided to receive bolts (not shown) to attach the housing to a supporting structure (also not shown). The bearing also comprises an inner race 18 adapted to be secured to a shaft (not shown), and an outer race 20 spaced from the inner race 18. Anti-friction elements 22 (shown as balls) are positioned between the races 18 and 20. Other types of anti-friction elements, such as rollers and the like may be used between the races without departing from the spirit of the invention. As is usual for such bearings, the outer surface 24 of the outer race is shaped to conform substantially to the inner surface 26 of the housing 12.

The housing 12 is provided with a lubrication passage 28 therethrough and the outer portion 30 of the passage 28 is threaded to receive a threaded grease fitting 32. The outer race is provided with what is termed in the art as a dimple 34 and a relatively small diameter passageway 36 joins the tapered bottom 38 of the dimple 34 and the space between the races in which the anti-friction elements are located. The dimple is aligned with the housing lubrication passage 28 and a locking or locating pin 40 is received in the aligned lubrication passage and dimple. The locating or locking pin serves to substantially prevent relative rotation between the housing and the outer race yet permits slight angular misalignment of the shaft and the supporting surface.

The locking or locating pin 40 of this invention comprises a generally cylindrical sleeve 42 and an inner telescoping member 44, the member 44 fitting snugly into a bore 46 in the sleeve 42. The ends of the sleeve 42 and of the telescoping member 44 are provided with V-shaped slots or passageways 48 and 50, so as to provide passageways for lubricant to pass to the space between the races for lubricating the anti-friction elements.

The locking pin 40 is preferably manufactured from a slug of metal (40A) by a cold heading technique in which the member 44 is pushed to tear-out, but not pushed free of the outer cylindrical sleeve, i.e., a shearing action. As manufactured, the pin 40 is inserted into the aligned passage 28 and the dimple, and the grease fitting is set and tightened down. This results in an axial force being applied to the pin, such that the member 44 telescopes, at least partially into the sleeve 42, causing no damage to the outer race. In short, the locking pin of this invention adjusts to a lightly compressed length without damaging the remainder of the bearing. This is especially important for users who repair bearings when a grease fitting is changed or when inserting a new locking pin necessitated by the previous pin being sheared off because of some misalignment or seizing of the elements.

The appended claims are intended to be construed as broadly as the prior art will permit.

I claim:

1. A bearing comprising a housing; an inner race and an outer race spaced from the inner race; anti-friction elements in the space between the races; the inner and outer races and the anti-friction elements being received in the housing; a lubrication passage through the housing; a dimple in the outer race having a bottom wall and being aligned with the lubrication passage; a small diameter passageway through the outer race joining the dimple and the space between the races; a locking pin in the lubrication passage which extends into the dimple and seats on the bottom thereof, said locking pin having an outer sleeve and an inner telescoping member; and a grease fitting threadably received in the lubrication passage which when set can exert an axial compressive force on the locking pin, whereby the locking pin telescopes to a lesser length when an axial compressive force is applied thereto.

2. In a bearing having a pair of spaced races with anti-friction means therebetween, said races and anti-friction means being supported in a housing, means to permit the passage of lubrication to said anti-friction means, and means to substantially prevent relative rotation between said outer race and said housing comprising a locking pin, said locking pin comprising a generally cylindrical outer sleeve and a pin-like member snugly fitting in said sleeve, said pin-like member telescoping into said sleeve upon the application of an axial compressive force thereto.

3. A locking pin for use only in an anti-friction bearing having an outer race and a housing with a radial opening through a portion thereof and adapted to control relative rotation between said outer race and said housing, said locking pin being received in said opening and extending toward said outer race, said locking pin comprising a sleeve and a pin-like member received in said sleeve, said pin-like member being adapted to telescope into said sleeve upon the application of an axial compressive force thereon.

4. A locking pin as recited in claim 3, wherein said housing opening is larger in diameter than said sleeve and said outer race has a dimple therein, and wherein a portion of said locking pin extends into said dimple.

* * * * *